July 18, 1967  J. A. HOLTON, JR  3,331,363
MOTORIZED ADAPTER FOR PULL-CORD POWER DRIVE
Filed Sept. 20, 1965  2 Sheets-Sheet 1

July 18, 1967        J. A. HOLTON, JR        3,331,363
MOTORIZED ADAPTER FOR PULL-CORD POWER DRIVE
Filed Sept. 20, 1965        2 Sheets-Sheet 2
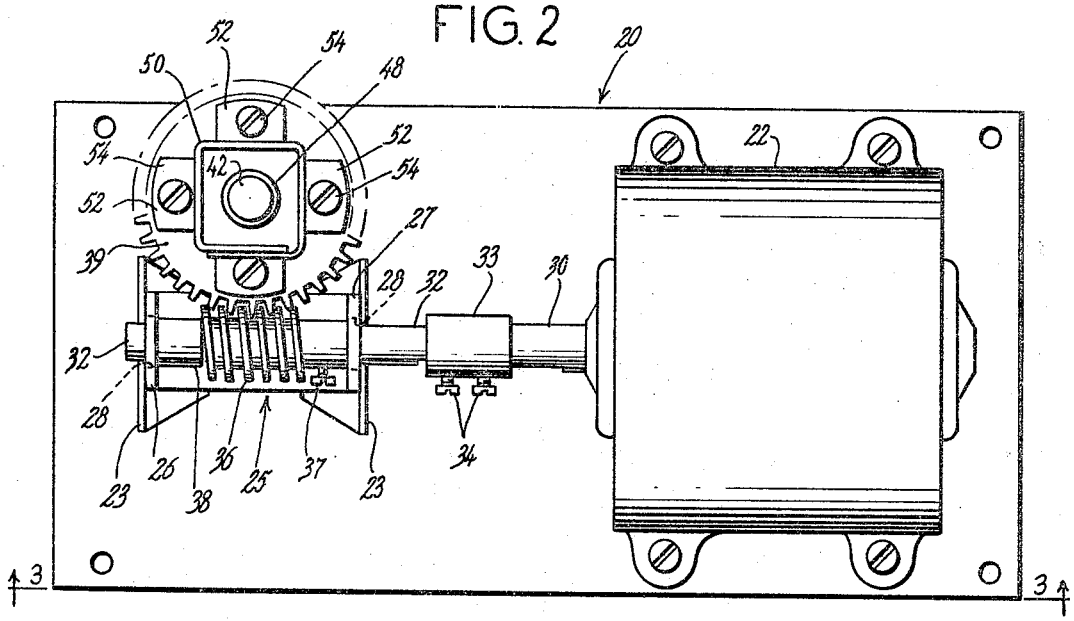
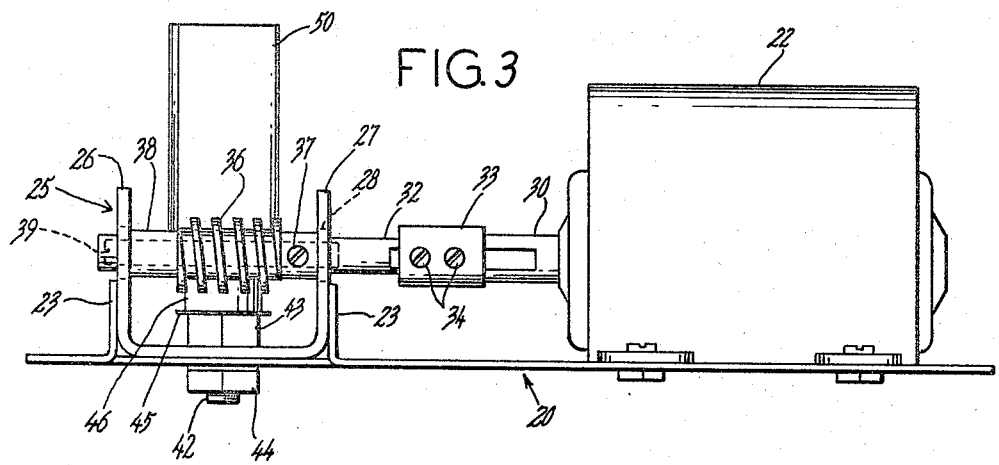

3,331,363
MOTORIZED ADAPTER FOR PULL-CORD POWER DRIVE
Jesse A. Holton, Jr., 50 Fay Lane, Northboro, Mass. 01532
Filed Sept. 20, 1965, Ser. No. 488,406
2 Claims. (Cl. 123—179)

This invention relates to power units of the internal combustion engine type and more particularly to such units that use a pull-cord mechanism for starting purposes. The prime intent of this invention is to provide an adapter that replaces the pull-cord mechanism without appreciably modifying the basic power unit. The adapter of this invention is a motorized gear drive that includes a novel coupling unit that couples the adapter motor to the usual one-way clutch that is standard equipment provided with the power unit. Consequently, the adapter replaces the common pull-cord and conveniently adapts within the housing that heretofore mounted the pull cord and encases the one-way clutch unit and associated mechanism. Thus the only modification made to the power unit is removal of the pull-cord mechanism and provision of mounting holes in the casing. With the apparatus of this invention the only requirement to start the power unit is to energize the adapter motor by connecting it to a power source. No physical exertion is experienced.

With the usual pull-cord, turning over a power unit such as a lawn mower can be an arduous task. For the physically handicapped, such as those with a heart ailment or weakening disease, the task may be prohibitive. Women find the task distasteful if not impossible. Moreover, the more exertion expended the greater the danger for exposure to serious injury, particularly from the blade of the mower.

It should be here noted that there are in existence other starting devices for power units such as lawn mowers that physically carry the operator. But these machines are no longer the portable type and require a starting system similar to that of an automobile where an expensive and bulky starter-generator principle is used which cannot be readily applied to the push-type mower without considerable modification and expense.

The one intent of this invention is to provide a compact starting device in the form of an adapter that may be applied to existing power units.

The invention also includes the design and construction of such an adapter that is sufficiently inexpensive to be within the purchasing power of the average homeowner.

A prime purpose of this invention is to provide a starting device for a portable power unit that requires no physical exertion on the person starting such unit.

Accordingly, the apparatus of this invention is extremely simple in concept and operation and is adaptable to existing power devices such as the exemplary lawn mower, as may be seen by reference to the drawings in which:

FIG. 2 is a bottom plan view of the adapter.

FIG. 3 is a side elevational view of the adapter as viewed along lines 3—3 of FIG. 2.

Figure 1:
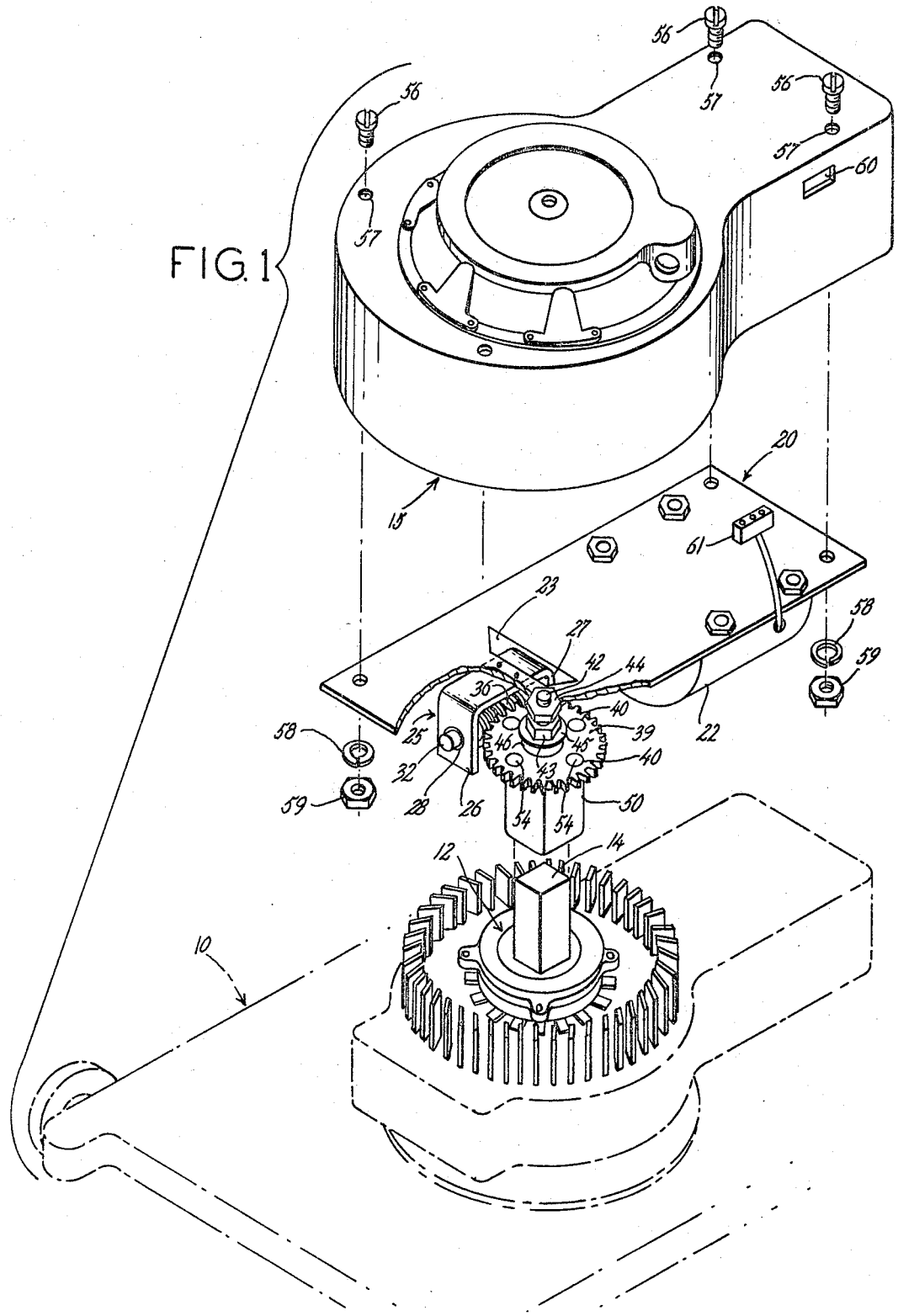
FIG. 1 is an exploded, perspective view illustrating the manner in which the adapter mounts to the upper housing of a power mower and couples with the one-way clutch starting assembly.

Referring now to FIG. 1 wherein a commercially available rotary type lawn mower is partially shown, the base of the mower is indicated in phantom at 10. The usual one-way clutch assembly is designated at 12 and the coupling means integral therewith at 14. As is very well known in connection with such mowers, the coupling means 14 couples with a socket provided in a disc of the pull-cord assembly (not shown) provided in a housing 15. Briefly stated, when the pull-cord is vigorously jerked the one-way clutch turns over the engine, which causes a gasoline spray in the combustion chamber and causes a spark to develop across the spaced terminals of a spark plug. The spark across the terminals ignites the gasoline spray causing a mild explosion in the combustion chamber which starts the engine. It is also very well known that the above action rarely occurs on the first jerk when cranking a cold or unconditioned engine. On the contrary, the vigorous and jerking action is repeated numerous times before combustion takes place and the engine set off to run under its own timing and power. It is well appreciated that such action imposes a more than ordinary physical tax on the operator. With the adapter now to be described and applied to such a power unit, physical exertion is entirely eliminated.

In the drawings, a thin platform 20 of generally rectangular form may be of an aluminum alloy, light in weight but rigid in character. A motor 22 mounts on platform 20 as shown. A pair of tabs 23 are struck-up from platform 20 and serve to rigidly secure a generally U-shaped bearing supporting member 25 having legs 26 and 27. Member 25 is firmly fixed to tabs 23 and the base of platform 20 as by riveting or spot welding and legs 26 and 27 are provided with bearing inserts 28 which may be pressed therein. A motor shaft 30 is coupled to a second shaft 32 by a collar 33 and set screws 34. Shaft 32 journals in bearing inserts 28 and fixedly mounts a worm 36 as by set screw 37. Worm 36 is confined from lateral movement by a spacer 38 which loosely fits on shaft 32 between an end of worm 36 and leg 26 of member 25. A worm gear 39 provided with threaded bores 40 (FIG. 1) is mounted for free rotation by a headed stud 42. Stud 42 is threaded at its lower portion and is fixed to platform 20 as by nuts 43 and 44. A thrust washer 45 fits between a hub 46 of gear 39 and nut 43. A second thrust washer 48 (FIG. 2) may be placed between the head of stud 42 and gear 39. An elongate coupling 50 of generally square appearance mounts on gear 39 as by tabs 52. Coupling 50 has a hollow interior and may be formed from sheet metal with tabs 52 flared from its base and fixed to gear 39 as by screws 54 which thread into bores 40. By reference to the drawings it can be seen that worm gear 39 meshes with worm 36 and is rotatable thereby when motor 22 is energized.

As illustrated in FIG. 1, platform 20 is rigidly mounted to the inside, upper portion of housing 15 as by bolts 56. Bolts 56 pass through bores 57 in the housing and receive lock washers 58 and nuts 59. Platform 20 replaces the usual pull-cord and arranged in housing 15 so that coupling 50 loosely fits over the one-way clutch coupling means 14. An opening 60 is also provided in housing 15 for accommodating a female receptacle 61 that is wired to the windings of motor 22.

For purposes of this description a sample operational arrangement will now be set out. Accordingly, excellent results have been obtained by providing a ratio of 40:1 between motor and output shaft 30 and the gearing 36, 39. That is, if the motor turns output shaft 30 at 1750 r.p.m., the fly wheel and mower blade will be turned over at better than 40 r.p.m. which speed has been found to be adequate for immediate starting of the mower. This is roughly the speed attained when the manual pull-cord (herein eliminated) is used, but as can be well appreciated, manual jerking of the pull-cord is a static, repetitious action whereas the action attained by use of the motor 22 is constant to thereby facilitate starting. The motor may be of the double-wound A.C., D.C., variety this is well known, for one example, in the electric shaver art. Of course, the motor used in connection with this invention develops a much greater torque output than the miniature electric shaver type but is wound on the same principle. More specifically, a one-quarter H.P. motor of this type has performed extremely well. For connection purposes, receptacle 61 has three connecting terminals. When using the domestic A.C. power supply, the standard power cord having a two-prong, male plug connects to two terminals of receptacle 61 for energizing the A.C. winding of motor 22. When using battery power such as through the cigarette lighter connection in an automobile, a power cord having a three-prong male plug connects to all three terminals of receptacle 61 for energizing the D.C. winding of the motor. In each instance of energizing motor 22, shaft 30 will rotate worm 36 and gear 39 causing coupling 50 to turn over the engine through one-way clutch coupling means 14. Once started, the plug is removed and the power unit runs under its normal cycling system. Alternatively, a switch may be provided on the power cord for "on" and "off" purposes. When the power unit starts while the motor 22 remains energized, member 14 also rotates but without consequence as the one-way clutch is rotated at a slower speed than the engine rotates under its own power.

Having made detailed description of the novel adapter in its preferred form, it should be understood that the invention is not limited to the exact form illustrated since certain changes may be made in the specific construction without departing from the spirit of the invention. For example, the member 50 that couples with member 14 may be a groove and slot connection and the adapter principle to replace the pull-cord may be used in connection with power saws, snow blowers, outboard motors, industrial pumps and other manually cranked portable devices. Moreover, the adapter may be mounted on the outside of the housing with slight alteration instead of within as illustrated; and the motor driven shaft and worm may be a single unit formed from the same stock.

What is claimed is:

1. In a power unit of the internal combustion engine type wherein a one-way clutch provided with a coupling arrangement that is adapted for free rotation only in one direction and encased by a housing that normally accommodates a pull-cord mechanism used to crank the power unit for purpose of starting that unit, an adapter for replacing the pull-cord mechanism comprising in combination: a platform fixed to the housing for mounting a motor and a bearing supporting member, means for energizing the motor, a motor output shaft to which a worm is fixed, the shaft mounted for rotation on the bearing supporting member, a worm gear adapted for rotation on a stud fixed in the platform, the worm gear in mesh with the worm, a coupling having flared tabs, the coupling fixed to the worm gear by means of the tabs and adapted to couple with the one-way clutch arrangement for cranking the power unit to effect its starting when the motor is energized.

2. In a lawn mower of the internal combustion engine type wherein a one-way clutch provided with a coupling arrangement that is adapted for free rotation only in one direction and encased by a housing that normally accommodates a pull-cord mechanism used to crank the mower for purpose of starting same, an adapter for replacing the pull-cord mechanism comprising in combination: a platform for mounting a motor and a bearing supporting member, a motor output shaft to which a worm is fixed, the shaft mounted for rotation on the bearing supporting member, a worm gear adapted for rotation on a stud fixed in the platform, the worm gear in mesh with the worm, a coupling generally square in outward appearance and having a hollow interior, the coupling fixed on the worm gear, the platform fixed on the interior of the housing whereby the coupling is vertically aligned and the hollow interior thereof couples with the coupling arrangement of the lawn mower one-way clutch, and means to energize the motor to rotate the worm, worm gear and coupling thereon to start the mower.

References Cited

UNITED STATES PATENTS 2,895,295   7/1959   Carlson.
3,070,081   12/1962  Mercer _____ 123—179

MARK NEWMAN, *Primary Examiner.*

RALPH D. BLAKESLEE, *Examiner.*